P. B. TURNER.
CHEST MEASURING DEVICE.
APPLICATION FILED MAY 5, 1921.
1,404,812.
Patented Jan. 31, 1922.
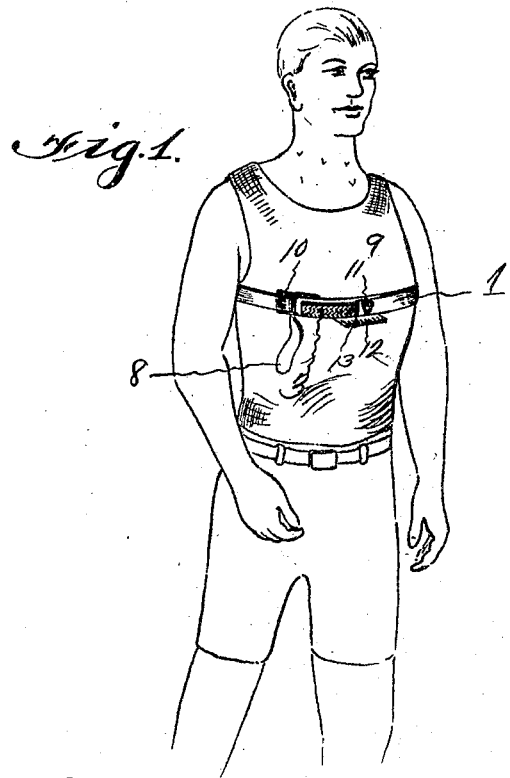
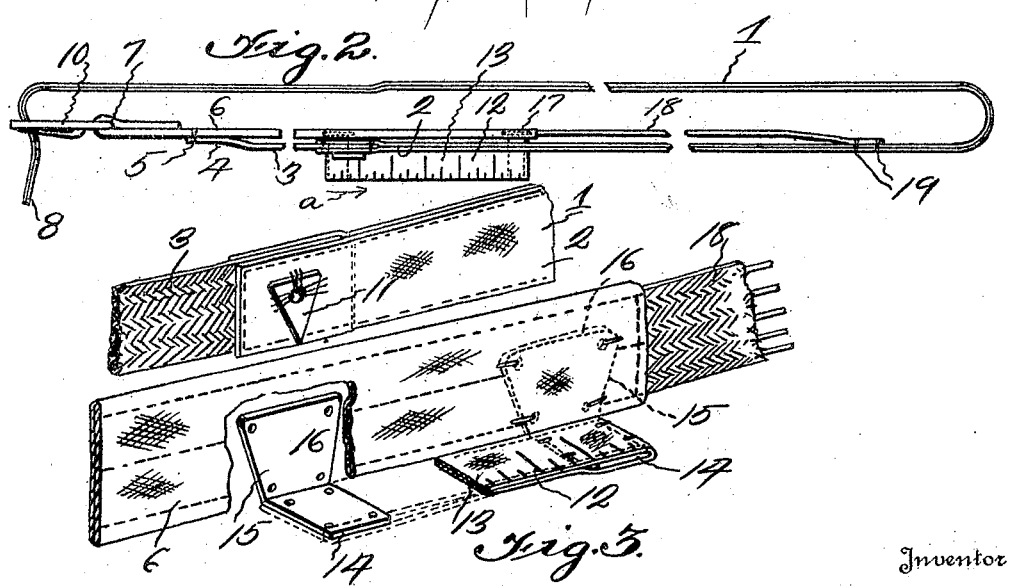
Inventor
Perry B. Turner
By D. Swift
  his Attorney

UNITED STATES PATENT OFFICE.

PERRY B. TURNER, OF AMERICUS, GEORGIA.

CHEST-MEASURING DEVICE.

1,404,812.  Specification of Letters Patent.  Patented Jan. 31, 1922.

Application filed May 5, 1921. Serial No. 466,992.

*To all whom it may concern:*

Be it known that I, PERRY B. TURNER, a citizen of the United States, residing at Americus, in the county of Sumter, State of Georgia, have invented a new and useful Chest-Measuring Device; and I do hereby declare the following to be a full, clear, and exact description of the invention, such as will enable others skilled in the art to which it appertains to make and use the same.

The invention relates to chest measuring devices, and has for its object to provide a device of this character formed from pliable material, and so constructed that the amount of expansion of the chest may be easily ascertained.

A further object is to provide a chest measuring device formed from pliable material, one end of which pliable material is provided with a horizontally disposed scale, the other end of the pliable material being provided with an indicating pointer and elastic connections between the ends of the pliable material, and the body of the pliable material at points spaced from the adjacent ends thereof.

A further object is to provide a chest measuring device, which device may be folded into a compact package and easily stored. Also to provide a chest measuring device which will contract and expand incident the exhaling and inhaling of the operator.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the measuring device, showing the same in position for use.

Figure 2 is an enlarged top plan view of the device.

Figure 3 is a detail perspective view of the overlapped ends of the pliable member, showing the same in position to be placed in engagement with each other.

Referring to the drawings, the numeral 1 designates a strap, preferably formed from fabric and to the end 2 of which strap an elastic member 3 secured. The end 4 of said elastic member is secured at 5 to a pliable fabric member 6, which pliable member is provided with a buckle 7 for the reception of the end 8 of the strap 1. It will be seen that when the strap 1 is passed around the chest 9 of the operator and its end passed through the buckle 10 that the measuring device may be adjusted on the chest 9 of the operator in such a manner that the elastic 3 will maintain the device in place when the operator inhales or exhales. When the operator expands his chest the elastic member 3 is stretched thereby allowing the indicator pointer 11 carried by the end 2 of the strap to move in the direction of the arrow *a* for indicating on the scale 12 carried by the end of the pliable member 6, the amount of chest expansion of the operator. The scale 12 is printed on a flexible fabric strip 13 and is horizontally disposed, the ends of said strip being sewed or otherwise secured in the horizontal portions 14 of right angle members 15, the vertical portions 16 of which are sewed to the pliable member 6. It will be seen that by providing a pliable measuring member 13, and the right angled members 15 that the device as a whole may be folded or rolled into a compact package, thereby allowing easy storage and package and shipment in large lots.

Secured to the end 17 of the pliable member 6 is an elastic member 18, which elastic member is secured as at 19 to the main pliable member 1, and forms means whereby when the operator exhales, the device as a whole will be contracted, said contraction of the device being also assisted by the elastic member 3. It will be seen that when the operator continuously inhales and exhales for expanding and contracting the chest, that the indicating pointer 11 will move longitudinally over the scale 12, thereby allowing the operator to note the amount of expansion and contraction during each inhalation and exhalation.

From the above it will be seen that a chest measuring device is provided, which device is practically entirely formed of pliable material, thereby allowing the same to be easily stored and shipped, also that the device is simple and the parts reduced to a minimum.

The invention having been set forth what is claimed as new and useful is:

A chest measuring device comprising a pliable strap adapted to be passed around the chest of an operator, the ends of said strap being overlapped, elastic members connecting the ends of the strap to the adjacent body portions of the strap and forming means for allowing the strap to be expanded and for causing the strap to contract during an inhaling or exhaling operation, horizontally disposed spaced brackets carried adjacent one end of the strap, a horizontally disposed pliable member having its ends secured to said brackets and provided with a scale, an indicating pointer carried by the other end of the strap and adapted to move longitudinally in relation to the scale carrying member as the strap is expanded or contracted.

In testimony whereof I have signed my name to this specification in the presence of two subscribing witnesses.

PERRY B. TURNER.

Witnesses:
J. G. HOLST,
H. E. ALLEN.